United States Patent
Sramka

(10) Patent No.: US 10,678,774 B2
(45) Date of Patent: Jun. 9, 2020

(54) GENERATING SOURCE CODE FOR CREATING DATABASE TRIGGERS

(71) Applicant: Toshiba Global Commerce Solutions Holdings Corporation, Tokyo (JP)

(72) Inventor: Peter Sramka, Raleigh, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 960 days.

(21) Appl. No.: 15/087,141

(22) Filed: Mar. 31, 2016

(65) Prior Publication Data

US 2017/0286474 A1 Oct. 5, 2017

(51) Int. Cl.
- *G06F 16/00* (2019.01)
- *G06F 16/23* (2019.01)
- *G06F 16/22* (2019.01)
- *G06F 16/901* (2019.01)

(52) U.S. Cl.
CPC ...... *G06F 16/2365* (2019.01); *G06F 16/2282* (2019.01); *G06F 16/9024* (2019.01)

(58) Field of Classification Search
CPC .................................................. G06F 16/2365
USPC .................................................. 707/690, 702
See application file for complete search history.

(56) References Cited

U.S. PATENT DOCUMENTS

| | | | |
|---|---|---|---|
| 5,488,722 A | | 1/1996 | Potok |
| 6,052,687 A | * | 4/2000 | Miura ............... G06F 16/94 |
| 6,304,876 B1 | | 10/2001 | Isip, Jr. |
| 6,850,922 B1 | | 2/2005 | Wason |
| 7,240,054 B2 | | 7/2007 | Adiba et al. |
| 7,328,212 B2 | | 2/2008 | Voss et al. |
| 7,788,241 B2 | | 8/2010 | Cheng et al. |
| 7,818,305 B2 | * | 10/2010 | Anjur ............... G06F 16/24565 707/702 |
| 7,984,021 B2 | | 7/2011 | Bhide et al. |
| 8,108,431 B1 | | 1/2012 | Guner et al. |
| 8,332,349 B1 | | 12/2012 | Wilson |
| 8,849,771 B2 | | 9/2014 | Berg-Sonne |

(Continued)

FOREIGN PATENT DOCUMENTS

| | | |
|---|---|---|
| WO | 9703406 A1 | 1/1997 |
| WO | 0113303 A1 | 2/2001 |

(Continued)

OTHER PUBLICATIONS

Ceri, S. et al., "Deriving Production Rules for Constraint Maintenance", VLDB Conference 1990, pp. 566-577.

(Continued)

*Primary Examiner* — Chelcie L Daye
(74) *Attorney, Agent, or Firm* — Coats + Bennett, PLLC

(57) ABSTRACT

A computing device obtains information associated with creating a plurality of database triggers. The computing device processes this information to determine a list of foreign keys that directly link a plurality of database tables. At least two of these database tables, however, are not directly linked. Therefore, the computing device uses the list of foreign keys to generate an indirect table path that indirectly links these two database tables through one or more intermediary tables. So linked, the computing device can automatically generate the source code for creating the plurality of database triggers to verify the integrity of the data stored in all of the plurality of database tables.

18 Claims, 10 Drawing Sheets

(56) References Cited

U.S. PATENT DOCUMENTS

| | | | |
|---|---|---|---|
| 8,898,124 B2 | 11/2014 | Anderson | |
| 2009/0037360 A1 | 2/2009 | Melamed | |
| 2011/0022575 A1* | 1/2011 | Tomkins | G06F 16/2365 707/702 |
| 2014/0250060 A1 | 9/2014 | Zhang et al. | |

FOREIGN PATENT DOCUMENTS

| | | |
|---|---|---|
| WO | 2006112969 A2 | 10/2006 |
| WO | 2012059816 A2 | 5/2012 |

OTHER PUBLICATIONS

Ceri, S. et al., "Automatic Generation of Production Rules for Integrity Maintenance", ACM Transactions on Database Systems, Sep. 1994, pp. 367-422, vol. 19, No. 3.

Mota-Herranz, L. et al., "Automatic Generation of Trigger Rules for Integrity Enforcement in Relational Databases with View Definition", 1998, pp. 286-297, retrieved on Mar. 14, 2016, retrieved from Internet http://users.dsic.upv.es/grupos/bdd/fqas98.pdf.

Stack Overflow, "How do I create a multiple-table check constraint?", pp. 1-3, retrieved on Mar. 14, 2016, retrieved from Internet http://stackoverflow.com/questions/2588072/how-do-i-create-a-multiple-table-check-constraint.

Stack Overflow SQL, "Unique constraint across multiple tables", pp. 1-5, retrieved on Mar. 14, 2016, retrieved from Internet http://stackoverflow.com/questions/10337944/sql-unique-constraint-across-multiple-tables.

Goldstein, J. et al., "Optimizing Queries Using Materialized Views: A Practical, Scalable Solution", ACM SIGMOD Record, 2001, pp. 1-12.

Microsoft, "Creating and Modifying Check Constraints", pp. 1-2, retrieved on Mar. 14, 2016, retrieved from Internet http://technet.microsoft.com/en-us/library/ms179491(v=sql.105).aspx.

Microsoft, "Check Constraints", pp. 1-3, retrieved on Mar. 14, 2016, retrieved from Internet http://technet.microsoft.com/en-us/library/ms188258(v=sql.105).aspx.

Richardson, T., et al., "Design of Capacity-Approaching Irregular Low-Density Parity-Check Codes", IEEE Transactions on Information Theory, Feb. 2001, pp. 619-637, vol. 47, No. 2.

Kim, W. et al., "Classifying Schematic and Data Heterogeneity in Multidatabase Systems", Computer, Dec. 1991, pp. 12-18, IEEE.

Date, C. et al., "A Guide to the SQL Standard: A user's guide to the standard database language SQL", Sep. 1997, pp. 182-193 and pp. 200-218, Fourth Edition, Addison-Wesley.

\* cited by examiner

GENERATING SOURCE CODE FOR CREATING DATABASE TRIGGERS

TECHNICAL FIELD

The present disclosure relates generally to database data verification, and more particularly to methods and devices for generating source code to create database triggers to verify data stored across multiple database tables.

BACKGROUND

Databases are currently in widespread use and are well-known to store organized collections of related data. Generally, related data is stored as one or more records in a variety of different table structures and may be linked, as known in the art, using primary and foreign keys. So linked, when the data in one table is added, deleted, or modified, the data stored in the second different table may also be added, deleted, or modified accordingly.

Often times, it is important to maintain the integrity of the data stored in the database tables. To accomplish this function, conventional database systems use database triggers. As is known in the art, database triggers comprise procedural code that automatically executes whenever a predetermined event (e.g., insert, delete, update, etc.) occurs on a particular table. For example, whenever a new record is created in a first database table, a corresponding new record may also be automatically created in a second database table and populated with related, and perhaps different, data. Similarly, whenever the data in the first table is modified or deleted, so, too, is the related data in the second database table.

DETAILED DESCRIPTION

Figure 1:
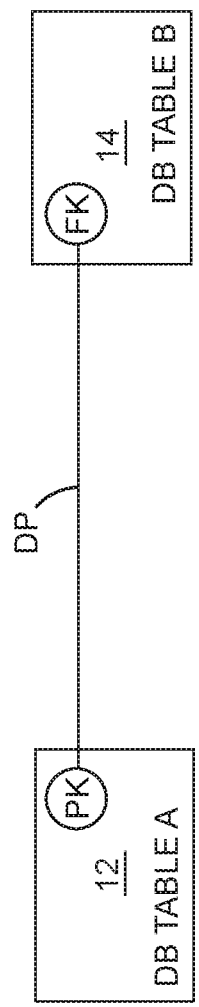
FIG. 1 is a block diagram illustrating a database system according to embodiments of the present disclosure.

FIG. 1 is a functional block diagram illustrating a database (DB) system 10 having two DB tables 12, 14. DB table 12 has defined a primary key PK, and DB table 14 has a foreign key FK that refers to the primary key PK of DB table 12. Whenever data is added to or modified in one of the DB tables 12, 14, a database trigger is executed to ensure that the integrity of the data in both DB tables 12, 14 remains intact.

As seen in FIG. 1, the foreign key FK of DB table 14 refers directly to the primary key PK of DB table 12. Thus, the link between these two DB tables 12, 14, is said to be a "direct" table path DP. However, there are situations in which the data of a first DB table is affected by the updates and modifications to the data in a second DB table that is not directly linked to the first DB table. That is, the integrity of the data stored in each of two different DB tables may still be affected by changes made to the data in the other of the two DB tables even though there is no "direct" table path DP between them (i.e., neither DB table has a foreign key FK that refers directly to the primary key PK of the other DB table). In such scenarios, therefore, the integrity of the data stored in these tables could be compromised. Embodiments of the present disclosure, however, address such scenarios by generating the source code needed to create the database triggers necessary for ensuring data integrity across multiple DB tables despite the lack of a direct table path DP between such DB tables.

Figure 2:
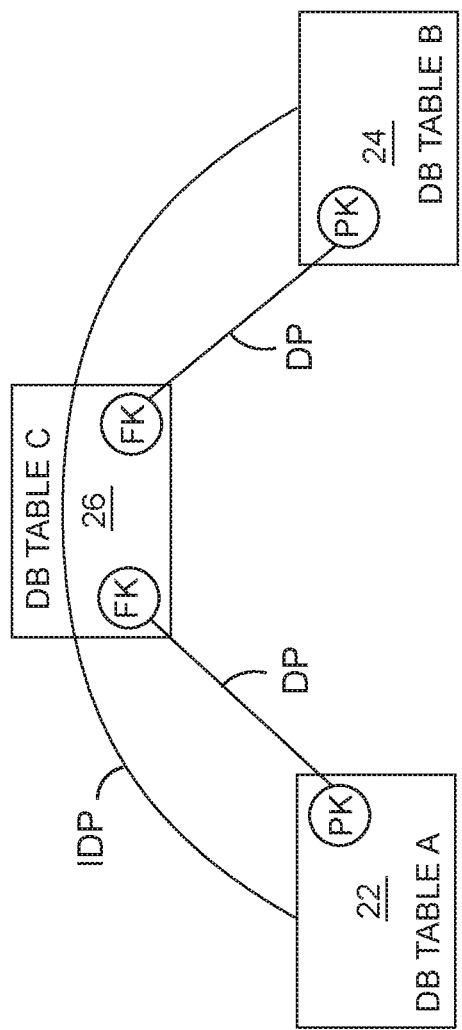
FIG. 2 is a block diagram illustrating a database system indirectly linking database tables according to embodiments of the present disclosure.

For example, FIG. 2 illustrates a database system 20 comprising three different DB tables 22, 24, 26. DB tables 22, 24 are referred to herein as "terminating" tables, while DB table 26 is referred to herein as an "intermediary" table. As seen in FIG. 2, DB table 22 comprises a primary key PK that is referred to directly by a foreign key FK defined in DB table 26, thereby forming a first direct table path DP between them. Similarly, DB table 26 has a foreign key FK that refers directly to a primary key PK in DB table 24, thereby forming a second, different direct table path DP between them. However, neither DB table 22 nor DB table 24 has a foreign key FK that points to the primary key PK of the other. Therefore, there is no direct table path DP possible between DB tables 22, 24.

Embodiments of the present disclosure, however, recognize the lack of a direct table path DP between two such tables, and generate an "indirect" table path IDP between two terminating DB tables such as DB tables 22, 24. Such indirect table paths are generated based on each of the direct table path DP "segments" that exist respectively between the intermediary DB table 26 and each of the terminating DB tables 22, 24. As described in more detail below, the indirect table path IDP, along with other data, is then used to generate the source code needed to create a plurality of database triggers. When executed, the plurality of database triggers verifies the integrity of the data stored in DB tables 22, 24, 26.

Figure 3:
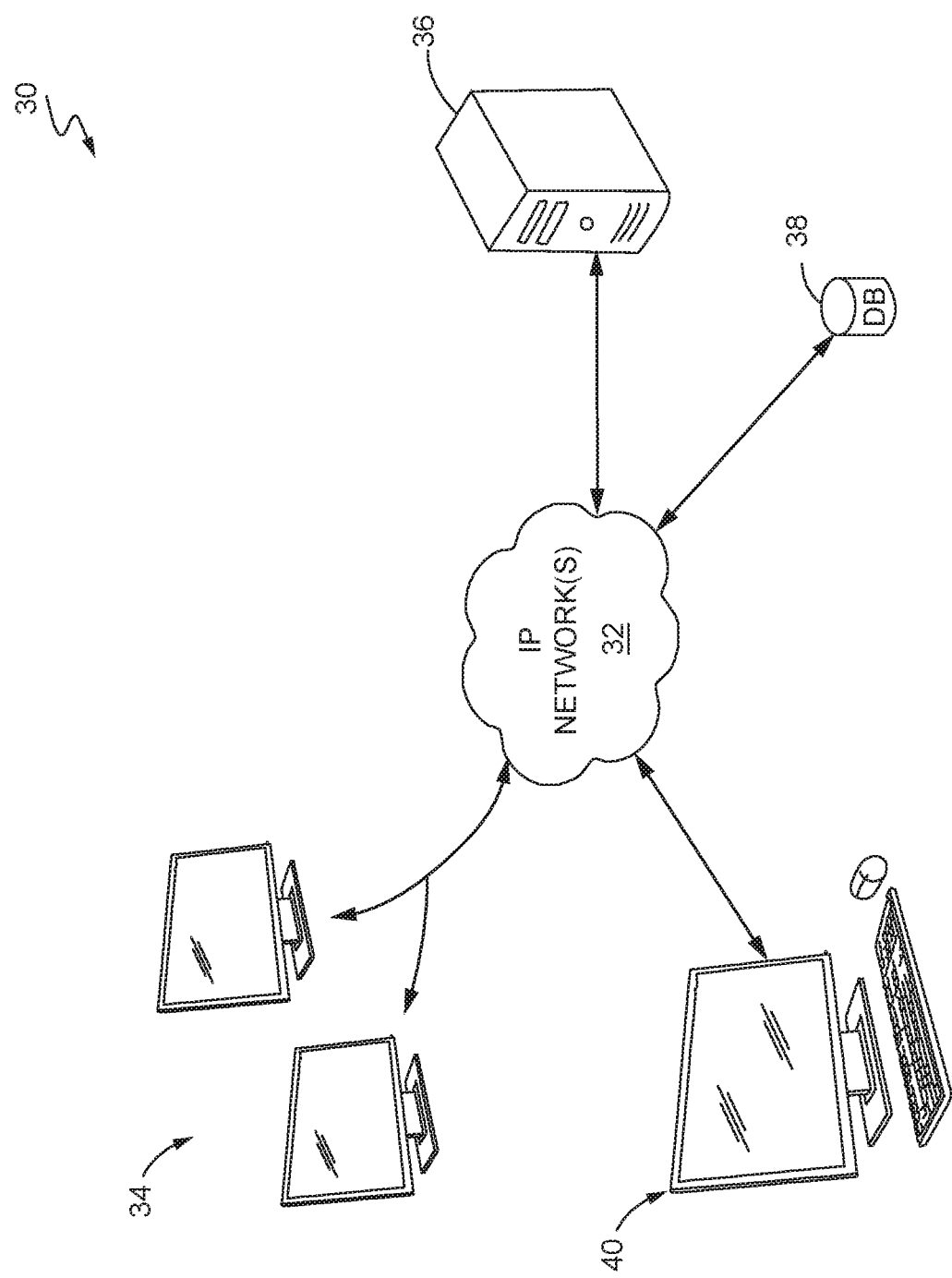
FIG. 3 is a block diagram illustrating a computer system suitable for use according to embodiments of the present disclosure.

FIG. 3 is a block diagram illustrating the functional components of a computer system 30 configured according to one embodiment of the present disclosure. As seen in FIG. 3, system 30 comprises an IP network 32 that communicatively connects a plurality of workstations 34 to one or more DB servers 36, one or more DB storage devices 38, and a control computer 40. Those of ordinary skill in the art will appreciate, however, that the components seen in FIG. 3 are merely illustrative, and that other embodiments of system 30 may comprise more or fewer components as needed or desired.

The IP network 32 may comprise any combination of one or more public and/or private computer networks known in the art (e.g., the Internet). However, according to the present disclosure, IP network 32 is configured to communicate data between devices in packets via, for example, Transport Control Protocol (TCP) and/or web socket transports. To accomplish this function, IP network 32 may comprise a variety of different devices not specifically shown in the Figures. These include, but are not limited to, routers, switches, gateway devices, and the like.

Generally, workstations 34 execute client applications that allow users to communicate and interact with a database program executing on the DB server 36. Normally, the intent of such interaction is to perform database operations on a digital database stored on DB storage device 38. For example, users may enter commands into the client application at workstation 34, or cause the client application to issue such commands, that are communicated to the database program on DB server 36. The database program, in turn, could then add or delete data to or from one or more DB tables, and/or modify existing data stored in one or more DB tables.

In many instances, the database stored at DB storage device 38 is a "relational" database. With relational databases, the data is organized and stored in a plurality of different tables. As previously described, each row or "record" in a table is uniquely identified using a key. Such keys may be either a primary key (PK), which uniquely identifies all the data records in a table, or a foreign key (FK), which uniquely identifies a data record in another table. As is known in the art, these keys are used to "directly link" related data records in one table to corresponding data records in one or more other tables.

Database triggers, which are stored by the database, comprise procedures that are triggered to execute whenever a change to the data in one of the tables is made. In some cases, the data stored in one table may be affected by modifications to the data in another table that are not "directly" linked via a FK. Such situations may be the result of any of a variety of causes. Regardless of the cause, though, the integrity of the data stored across such tables may be at risk in these situations. That is, given first and second database tables that have no direct table path (DP) between them (i.e., no direct link via a FK), it may be possible to add/delete/update the data in a first table without making a corresponding add/delete/update to the data in a second table.

Embodiments of the present disclosure, however, configure control computer 40 to create a plurality of database triggers in cases where two or more database tables are not directly linked together via a direct table path DP, but rather, are "indirectly" related via one or more "intermediary" database tables. In more detail, control computer 40 comprises a computing device configured to create the source code (e.g., Structured Query Language (SQL) code) that is used to create a plurality of database triggers. To accomplish this, the control computer 40 determines an "indirect table path" (IDP) between two database tables that are only related to each other through another database table. So determined, the control computer 40 generates the source code for the database triggers based, in part, on the IDP. The source code is then used to create the database triggers needed to verify the integrity of the data across the two "indirectly related" database tables, as well as any intermediary tables.

Figure 4A:
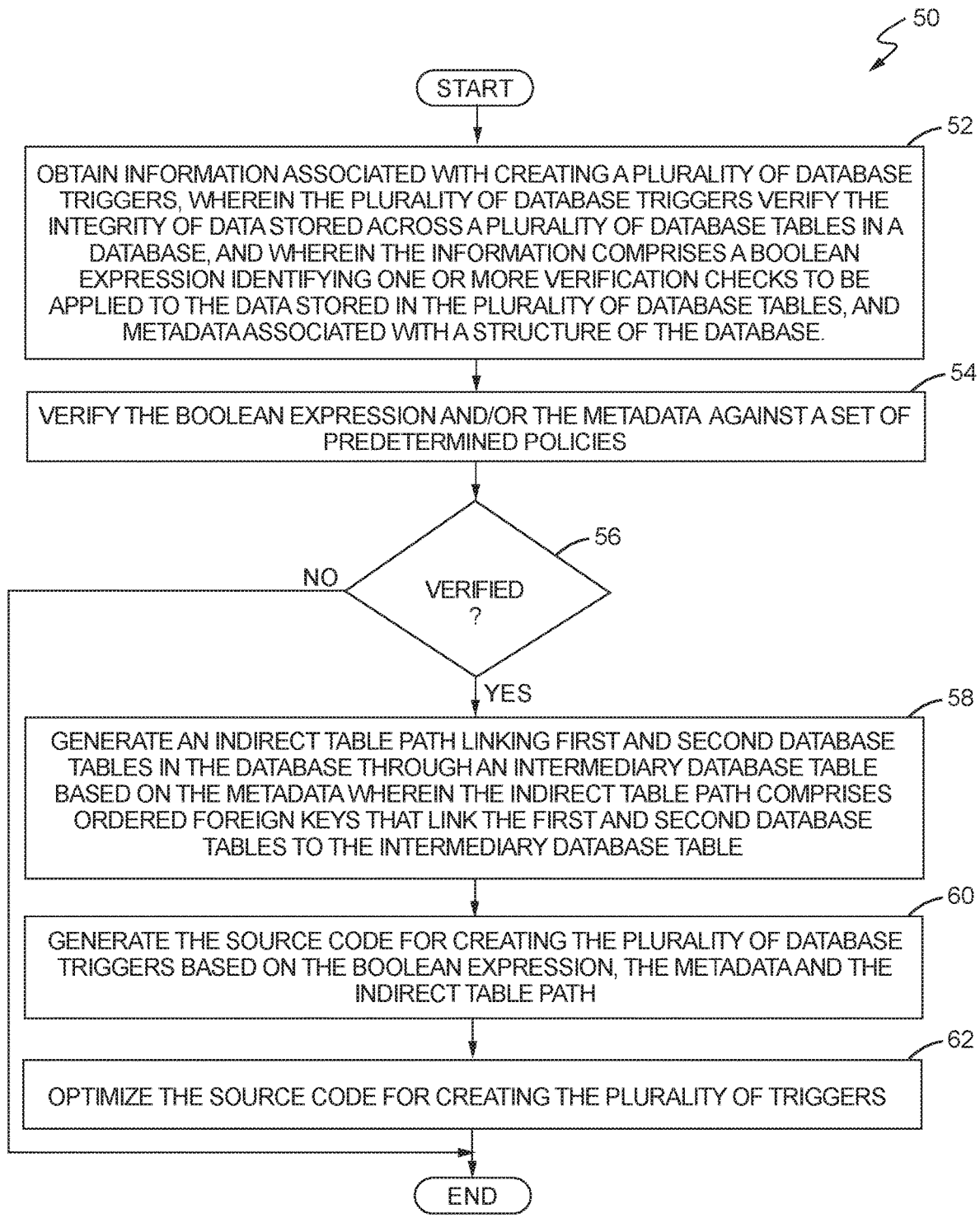
FIG. 4A is a flow diagram illustrating a method for generating source code for a plurality of database triggers according to embodiments of the present disclosure.

FIG. 4A is a flow diagram of a method 50 for creating the source code needed to create multiple database triggers according to one embodiment of the present disclosure. It should be noted that the embodiment of FIG. 4A is performed by the control computer 40. However, those of ordinary skill in the art should readily appreciate that this is for illustrative purposes only. The method 50 of the present embodiments may be implemented at DB server 36, or at some other application server (not shown) or client workstation 34.

Method 50 begins with the control computer 40 obtaining information that is associated with creating the plurality of database triggers. The information may comprise any data needed or desired, but in this embodiment, includes, but is not limited to, a Boolean expression identifying one or more verification checks that are to be applied to the data stored across multiple database tables and a set of metadata that is associated with a structure of the database (box 52).

The Boolean expression comprises a data expression formatted according to a predetermined format, for example, that indicates whether a data value in one table is used to constrain another data value in another table. By way of example only, consider a first database table having a "START_DATE" field, and a second database table having another "START_DATE" field and that is both a child of the first database table and indirectly related to the first database table. A value for the START_DATE field of the second database table is not valid if it pre-dates a corresponding value in the START_DATE field of the first database table. Therefore, a Boolean expression used for this particular constraint might be "TABLE1.START_DATE<=TABLE2.START_DATE." The Boolean expression obtained by the control computer 40 specifies these particular constraints, which the control computer 40 uses to generate the source code for the database triggers.

The metadata obtained by the control computer is also utilized to generate the database trigger source code. Similarly to the Boolean expression, the metadata may comprise any type and amount of data needed or desired. For example, the metadata may identify the names identifying various database tables, as well as information describing the structure of the tables. In this embodiment, however, the metadata comprises a list of foreign keys FKs directly linking each of the plurality of database tables.

Once the information has been obtained, control computer 40 will validate the Boolean expression and/or the metadata against information defined in one or more predetermined policies (box 54). By way of example, such predetermined policies may comprise information that specifies one or more of the following:

that each foreign key FK provided in the FK list actually exist in the database;

that no foreign key FK is specified more than once in the FK list;

that no foreign key FK in the FK list is reflexive (i.e., that no foreign key FK points to the primary key PK in its own database table);

that the Boolean expression only references table columns in the tables specified by the foreign keys FKs in the FK list;

that the Boolean expression references one or more columns of only one or two database tables; and that the Boolean expression is a valid Boolean expression as defined by the database management system.

Of course, other policies may be defined as needed or desired.

If the Boolean expression or the metadata is not verified (box 56) method 50 ends. In some cases, the control computer 40 may output an error message to the user indicating the reason for the termination.

If the Boolean expression and the metadata are verified, however (box 56), method 50 continues. Specifically, as was seen in FIG. 2, the control computer 40 will generate the indirect table path IDP between the two terminating database tables (e.g., database tables 22, 24) such that the IDP extends through an intermediary database table (e.g., database table 26) (box 58). By way of example only, the indirect table path IDP seen in FIG. 2 would be "DB TABLE C→DB TABLE A; DB TABLE C→DB TABLE B." The indirect table path IDP is generated, in this embodiment, from the list of foreign keys FKs defined in the metadata obtained by the control computer 40. However, as seen later in more detail, the present disclosure is not so limited. The indirect table path IDP may be generated using a list of foreign keys FKs obtained by other means. Regardless of the manner in which the foreign keys FKs are obtained to generate the indirect table path IDP, however, the IDP indirectly links the two terminating database tables (e.g., DB tables 22, 24 of FIG. 2) through an intermediary DB table (e.g., DB table 26 of FIG. 2).

It should be noted that, in some embodiments, the indirect table path may be generated as part of the verification process performed by the control computer 40. Thus, the output of the verification process performed by the control computer 40 may comprise the generated indirect table path IDP. In such embodiments, the predetermined policies utilized by control computer 40 to perform the verification process may further comprise information that ensures one or both of the following:

that the database tables associated with the foreign keys FKs in the FK list form a single continuous path beginning with a first database table and terminating with a second database table, and that the database tables cannot be traversed in a circular manner via the foreign keys FKs in the FK list; and if the Boolean expression references two database tables, those two database tables are the first database table at the start of the single, continuous path and the second database table at the other, terminating end of the path.

Regardless of how the indirect table path is generated, however, once the indirect table path IDP has been generated, the control computer 40 can generate the source code for creating the plurality of database triggers (box 60). In this embodiment, the source code comprises SQL code, and is based on the constraint(s) identified in the Boolean expression, as well as on the metadata information and the indirect table path IDP. The source code that is generated, when executed, will create a plurality of BEFORE UPDATE triggers and a plurality of BEFORE INSERT triggers.

Once the source code is generated, that source code is performance optimized (box 62). The optimization ensures that the resultant database triggers will not check a rule unless one of the relevant columns in the DB tables has changed. This saves both memory and time (i.e., CPU cycles) resources for the computing device (e.g., DB server 36) that executes the database triggers. Listing 1 and Listing 2 are examples of such optimized source code.

Listing 1

```
CREATE TRIGGER `attendance_uv` BEFORE UPDATE
ON `attendance` FOR EACH ROW
BEGIN
  IF
    OLD.`session_pk` <> NEW.`session_pk` OR
    OLD.`enrollment_pk` <> NEW.`enrollment_pk`
  THEN
    IF EXISTS (
      SELECT * FROM
        `session`,
        `enrollment`
      WHERE
        `session`.`session_pk` = NEW.`session_pk` AND
        NEW.`enrollment_pk` = `enrollment`.`enrollment_pk` AND
        (NOT (`session`.`class_pk` = `enrollment`.`class_pk`)))
    THEN
      SIGNAL SQLSTATE 'HY000'
        SET MESSAGE_TEXT = 'Session/enrollment of attendance
  must reference same class.',
        MYSQL_ERRNO = 1;
      END IF;
  END IF;
END |
```

Listing 2

```
CREATE TRIGGER `attendance_iv` BEFORE INSERT ON
`attendance` FOR EACH ROW
BEGIN
  IF EXISTS
    SELECT * FROM
      `session`,
      `enrollment`
    WHERE
      `session`.`session_pk` = NEW.`session_pk` AND
      NEW.`enrollment_pk` = `enrollment`.`enrollment_pk` AND
      (NOT (`session`.`class_pk` = `enrollment`.`class_pk`)))
  THEN
    SIGNAL SQLSTATE 'HY000'
      SET MESSAGE_TEXT = 'Session/enrollment of attendance
  must reference same class.',
      MYSQL_ERRNO = 1;
    END IF;
END |
```

Figure 4B:
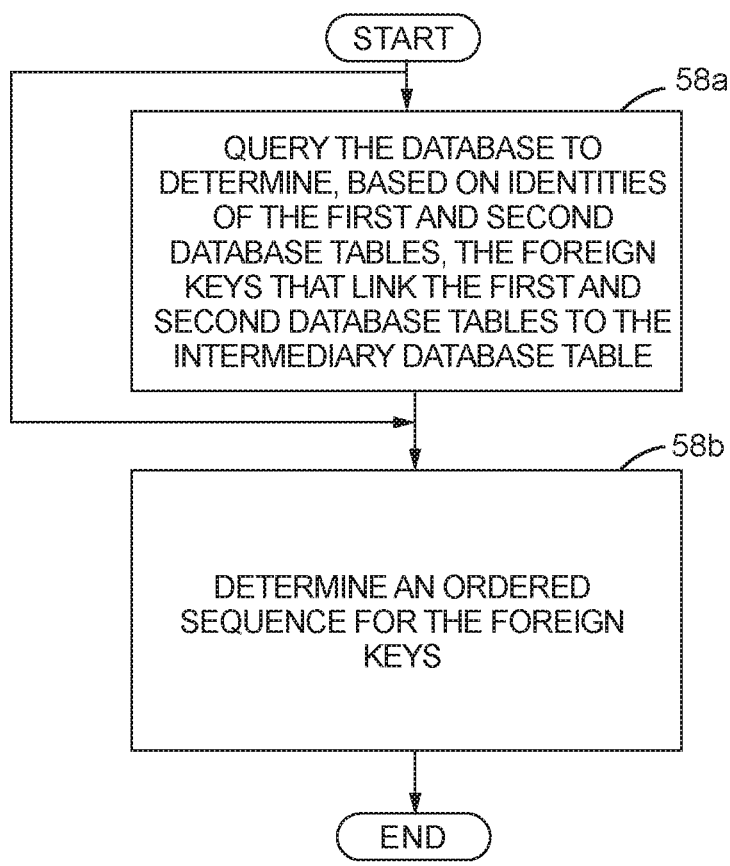
FIG. 4B is a flow diagram illustrating methods for generating an indirect table path linking multiple tables in a database system according to embodiments of the present disclosure.

As previously stated, control computer 40 is configured to obtain the list of foreign keys FKs in any number of ways, and then use those foreign keys FKs to generate the indirect table path IDP. FIG. 4B illustrates two possible ways of generating the indirect table path IDP, although other ways may also be possible.

As seen in FIG. 4B, the foreign keys FKs may be input into the control computer 40 by a user, for example. In one embodiment, the control computer 40 could simply determine an ordered sequence for the foreign keys FKs. Such ordered list comprises the indirect table path IDP (box 58b). Alternatively, however, the user may not know all the foreign keys FKs, and therefore, not be able to provide a coherent list of foreign keys FKs. In such embodiments, the user may simply provide the names or identities of the DB tables involved in an input string. Based on the contents of this input string (e.g., the names or identities of the DB tables), control computer 40 could generate and send a query to the database to determine the foreign keys FKs that link each of the identified DB tables (box 58a). Once the database responds with the foreign keys, the control computer 40 would determine an ordered sequence for the foreign keys FKs, as previously described (box 58b). The ordered list of foreign keys FKs comprises the indirect table path IDP.

Figure 5:
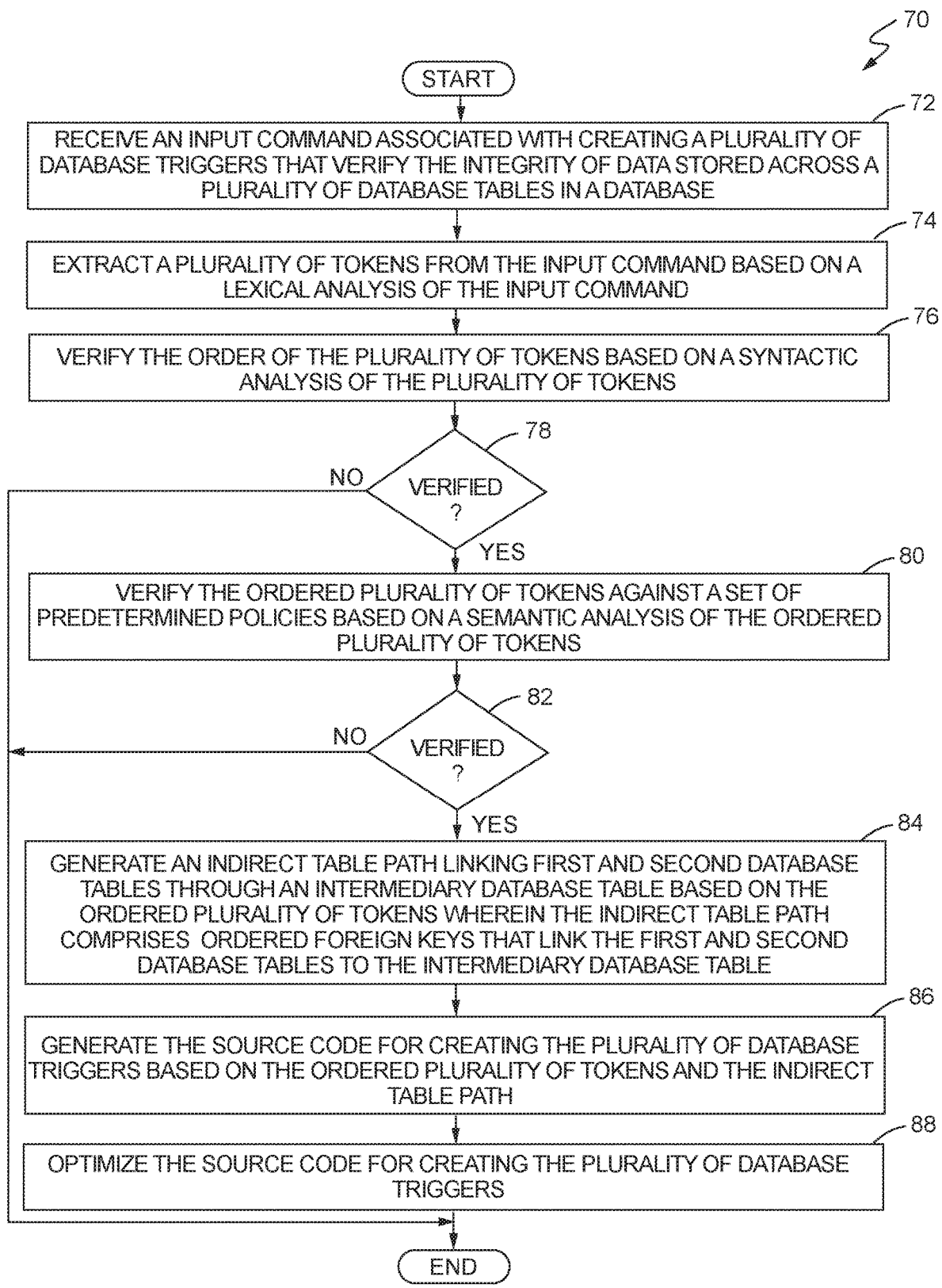
FIG. 5 is a flow diagram illustrating a method for generating source code for a plurality of database triggers according to embodiments of the present disclosure.

FIG. 5 illustrates a method 70 for generating the source code for a plurality of database triggers according to another embodiment of the present disclosure. For illustrative purposes, this embodiment is also described as if it were implemented by the control computer 40. However, method 70 may be implemented by other computing devices, such as DB server 36, an application server (not shown), client workstations 34, and the like.

Method 70 begins with the control computer receiving an input command associated with creating the plurality of database triggers (box 72). The syntax of the input command is similar to the syntax for the SQL language, and in one embodiment, is an extension to the SQL language. The extension need not execute natively on a Database Management System (DBMS); however, the control computer 40 implementing the embodiments of the present disclosure connects to a DBMS via Java Database Connectivity (JDBC). Further, the control computer 40 implementing the present embodiments comprises a configurable compiler that utilizes the input command written according to the SQL extension and generates native CREATE TRIGGER SQL statements as output. Therefore, the input command formatted according to the SQL extension may be implemented at a variety of DBMSs for which JDBC drivers are available.

In more detail, the control computer 40 first performs a lexical analysis on the input command, and extracts a plurality of tokens based on the results of that analysis (box 74). The tokens may comprise, for example, keywords, integers, identifiers, strings or single character tokens defining the list of foreign keys FKs, table names or identifiers, and the like. The control computer 40 then performs a syntactic analysis of the plurality of tokens, and based on that analysis, verifies the order of the plurality of tokens as input in the input command (box 76). If the order of the tokens cannot be verified (box 78), method 70 may end. In some cases, an error message may be output to the user explaining the reason for the failure of the process. If the order of the tokens can be verified (box 78), control computer 40 verifies the ordered plurality of tokens against a set of predetermined policies based on a semantic analysis of the ordered plurality of tokens (box 80). If the ordered tokens cannot be verified (box 82), method 70 may end. As above, an error message may be output to the user explaining the reason for the failure. If the ordered tokens can be verified (box 82), however, method 70 continues with the generation of the indirect table path IDP.

Particularly, control computer 40 generates the indirect table path IDP from the ordered tokens, which as stated above, may comprise the ordered list of foreign keys FKs (box 84). More specifically, the indirect table path IDP that is generated comprises the foreign keys that link the starting and terminating tables along the indirect table path IDP (e.g., DB tables 22 and 24 of FIG. 2) through an intermediary table (e.g., DB table 26 of FIG. 2). Once generated, control computer 40 then utilizes the information comprising the ordered plurality of tokens and the indirect table path IDP to generate the SQL source code for the plurality of database triggers (box 86). That source code may then be performance optimized, as described above, to ensure that precious memory and CPU resources are appropriately utilized (box 88).

As in the previous embodiment, the indirect table path IDP in the embodiment of FIG. 5 may be generated during verification of the ordered plurality of tokens (i.e., box 80) performed by control computer 40. Thus, in the embodiment of FIG. 5, the output of that verification process may comprise a verified generated indirect table path IDP that is utilized to generate the source code (box 86).

Figure 6:
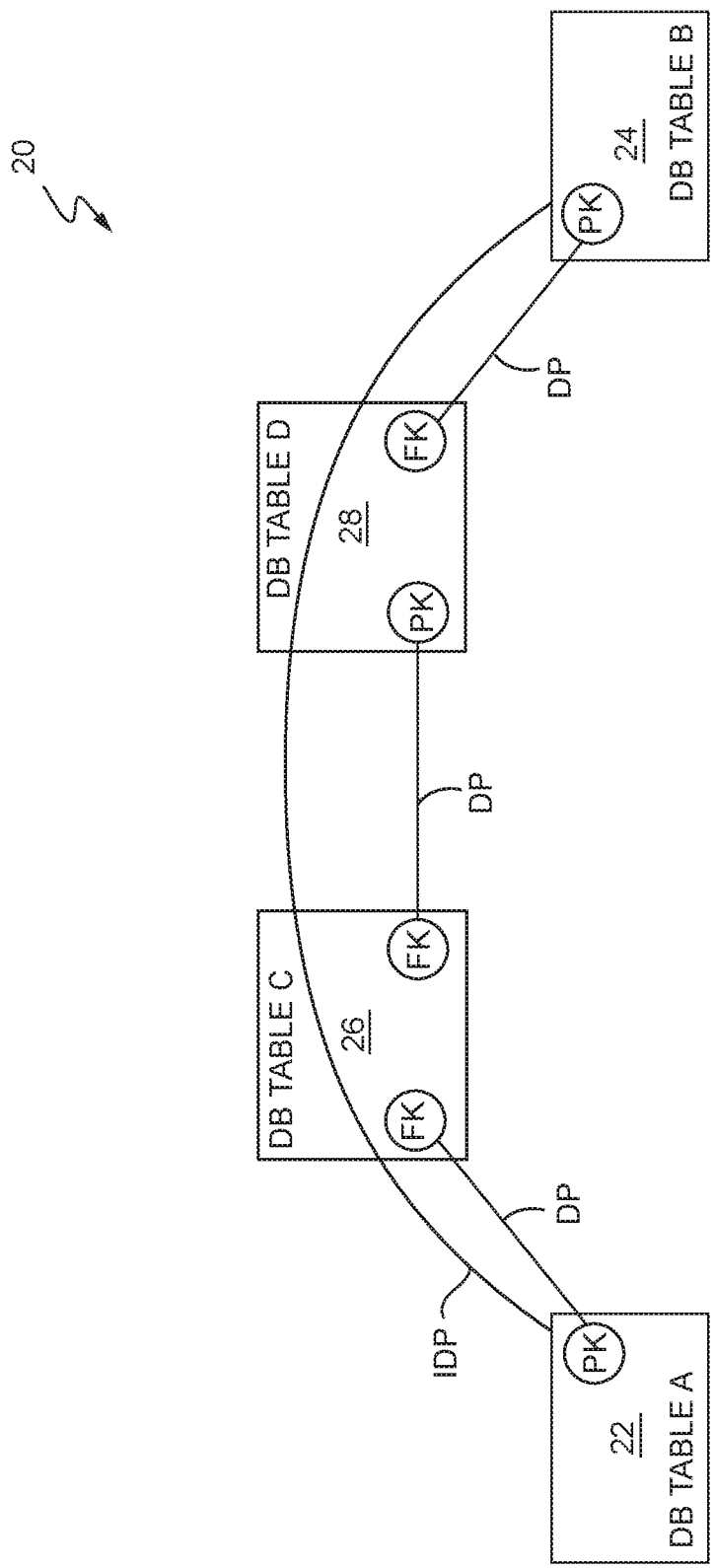
FIG. 6 is a block diagram illustrating a database system indirectly linking database tables according to embodiments of the present disclosure.

The previous embodiments illustrate the present disclosure in terms of generating a plurality of database triggers to validate the integrity of the data stored in three database tables—i.e., a pair of "terminating" DB tables 22, 24 and an intermediary DB table 26 (e.g., see FIG. 2). However, those of ordinary skill in the art will readily appreciate that such a simplistic example is for illustrative purposes only. Embodiments of the present disclosure may be implemented by control computer 40 to generate a plurality of database triggers for any number of database tables. FIG. 6, for example, illustrates an embodiment in which DB tables 22, 24 are indirectly linked via DB tables 26 and 28. As seen in FIG. 6, any two adjacent tables are directly linked to each other via primary and foreign keys. Thus, a direct table path DP exists between any two adjacent tables. Embodiments of the present invention, however, utilize information to identify an indirect table path IDP between the two terminating DB tables 22, 24, thereby indirectly linking those two DB tables. So linked, embodiments of the present disclosure can automatically generate the source code necessary for creating the plurality of database triggers needed to maintain the integrity of the data across all of the DB tables 22, 26, 28, 24, regardless of whether those tables are directly or indirectly linked.

Figure 7:
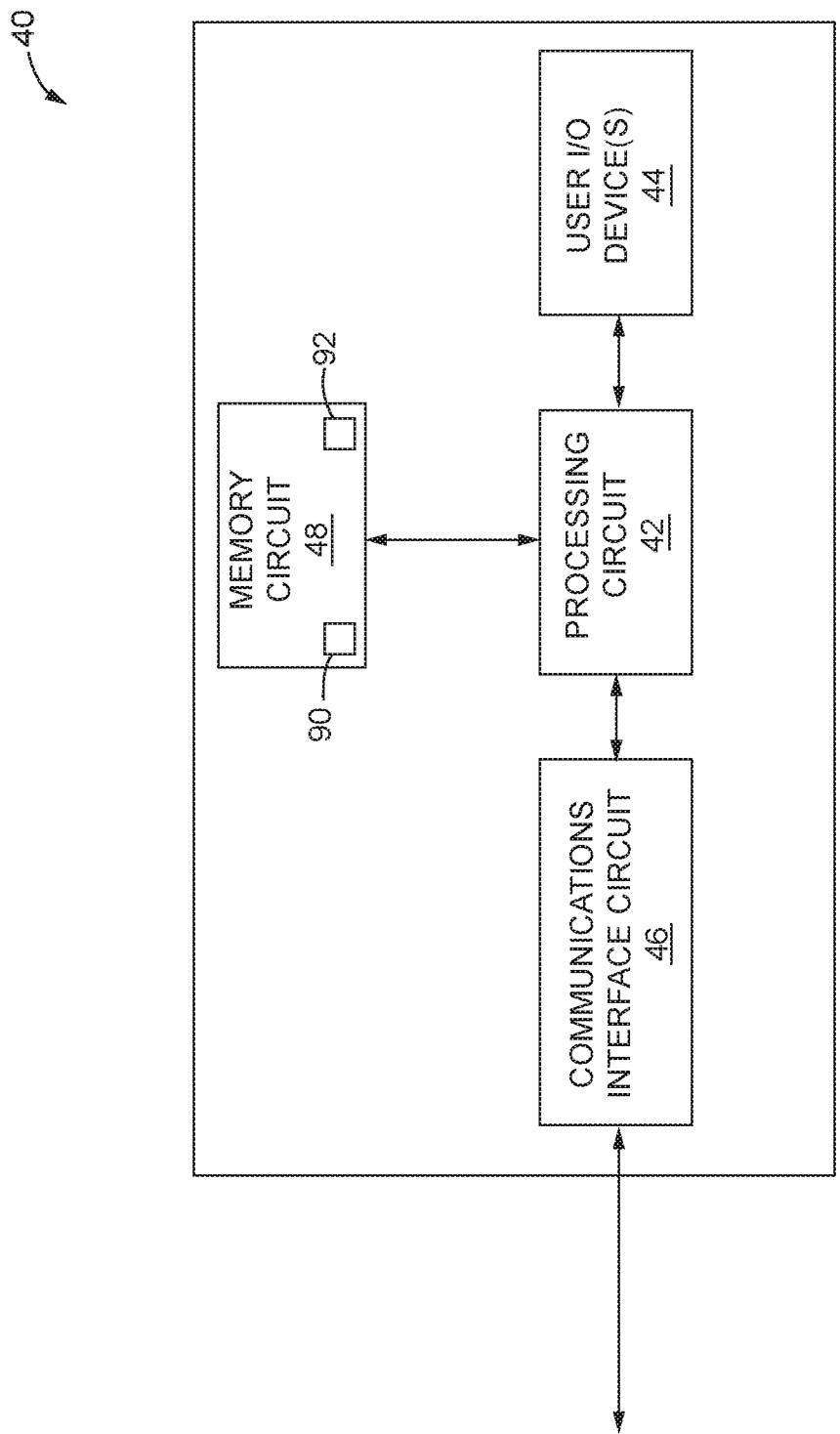
FIG. 7 is a functional block diagram illustrating some exemplary functional components of a computing device configured according to embodiments of the present disclosure.

FIG. 7 is a functional block diagram illustrating some functional components of a control computer 40 configured to implement embodiments of the present disclosure, as previously described. As seen in FIG. 7, control computer 40 comprises a processing circuit 42, one or more user input/output (I/O) devices 44, a communications interface circuit 46, and a memory circuit 48. Although not explicitly shown in the figures, control computer 40 may comprise additional components, as those of ordinary skill in the art will readily appreciate.

Processing circuit 42 may be implemented by one or more microprocessors, hardware, firmware, or a combination thereof. Processing circuit 42 generally controls the operation and functions of control computer 40, which may include, but are not limited to, receiving an input command and/or other information associated with creating a plurality of database triggers to verify the integrity of data stored across multiple DB tables, processing that command and/or information to generate an indirect table path IDP linking two tables that are not directly linked by primary and foreign keys, and generating, based on the information and the indirect table path, the source code that is used to create the plurality of database triggers. Additionally, the processing circuit 42 may be configured to optimize the generated source code to ensure optimized utilization of precious memory and CPU resources.

The user I/O devices 44 may comprise any number and variety of input and output devices that allow a user to interact with, and control the operation of, control computer 40. Such devices include, but are not limited to, one or more of a keyboard, a keypad, a mouse, a display, which may or may not be touch-sensitive, a microphone, speakers, and the like. In some embodiments, the user I/O devices facilitate the ability of a user to provide a formatted input command that contains the list of foreign keys and other information that is used to generate the source code for the plurality of database triggers.

The communications interface circuit 46 comprises a transmitter and receiver interface that enables the processing circuit 42 to communicate data and signals with the DB server 36 via IP network 32. The communications interface circuit 46 may effect such communications using one or more communication protocols known in the art or that may be developed, such as IMS/SIP, Diameter, HTTP, RTP, RTCP, HTTPs, SRTP, CAP, DCCP, Ethernet, TCP/IP, SONET, ATM, or the like. Further, communications interface circuit 46 may implement receiver and transmitter functionality appropriate to the communication network links (e.g., optical, electrical, and the like), and the transmitter and receiver functions may share circuit components and/or software, or alternatively may be implemented separately.

The memory circuit 48 may comprise any non-transitory, solid state memory or computer readable media known in the art. Suitable examples of such media include, but are not limited to, ROM, DRAM, Flash, or a device capable of reading computer-readable media, such as optical or magnetic media. Memory circuit 48 may be part of the same control computer 40 as processing circuit 42, or it may be separate from the control computer 40. Regardless of its configuration, however, the memory circuit 48 stores a control application 90 having logic and instructions that, when executed by the processing circuit 42, controls the control computer 40 to perform the functions previously described. Additionally, in some embodiments, the memory circuit 48 may also store one or more policies 92 that are utilized by the processing circuit 42 to verify information such as the Boolean expression, the metadata, the foreign keys, the order of any extracted tokens, the semantics of any extracted tokens, the characteristics of the indirect table path IDP, and the like.

Figure 8:
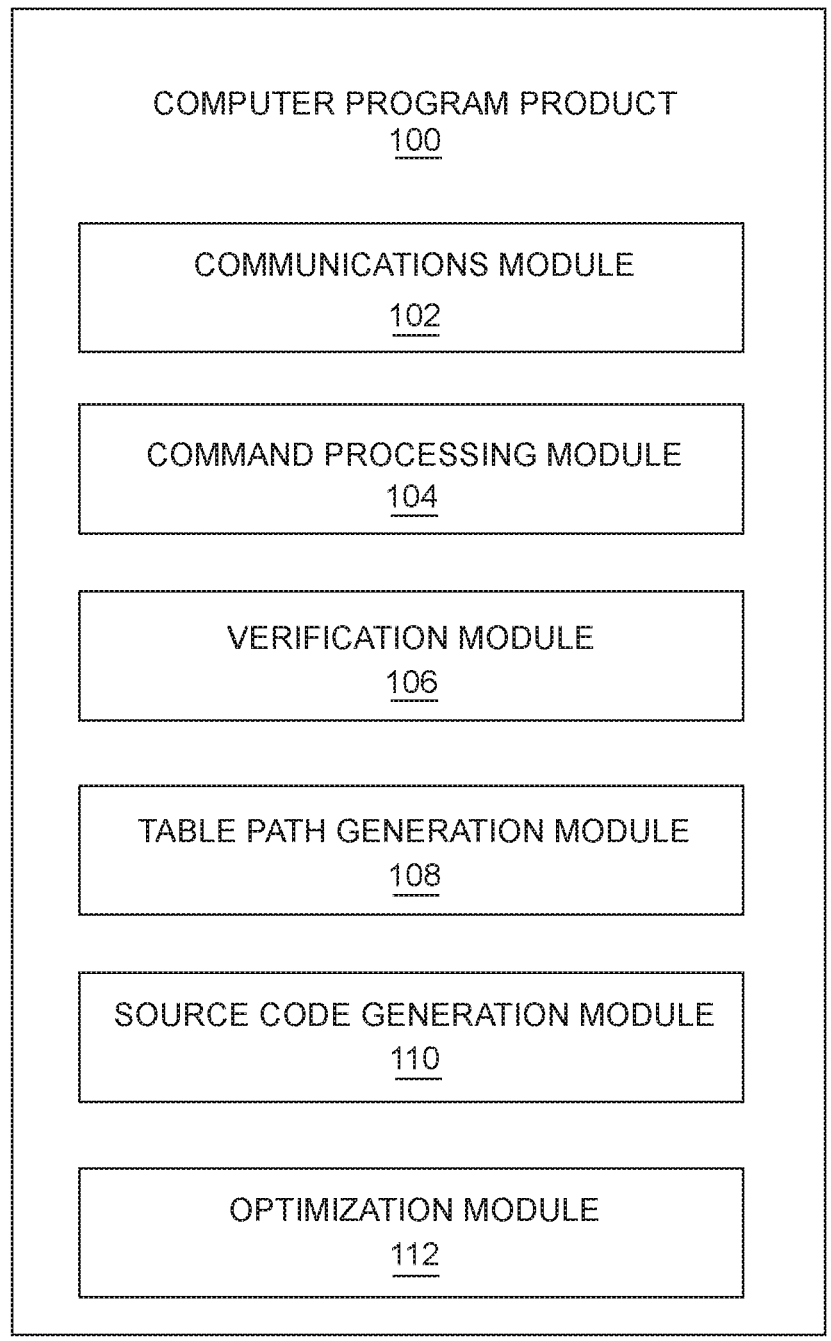
FIG. 8 is a functional block diagram illustrating a computer program product for generating source code for a plurality of database triggers according to embodiments of the present disclosure.

Another aspect of the disclosure, seen in FIG. 8, comprises a computer program product 100. The computer program product 100 comprises program code that is executable by a processing circuit of a computing device, such as processing circuit 42 of control computer 40. When executed, the computer program code configures the computing device to perform the functions previously described. The computer program product 100 may, for example, be embodied in a non-transitory, computer-readable storage medium, such as the memory circuit 48 of control computer 40, or a removable memory device, such as a thumb drive or disc, for example.

As seen in FIG. 8, the computer program product 100 comprises at least one of a communications module 102, a command processing module 104, a verification module 106, a table path generation module 108, a source code generation module 110, and an optimization module 112. Each of these modules may be executed by the processing circuit 42 of control computer 40.

The communications module 102 comprises computer program code that when executed by processing circuit 42, controls the control computer 40 to communicate with the DB server 36. Such communications are performed via IP network 32 using the well-known TCP/IP protocol, for example, and include the communication of messages to effect the automatic generation of source code for a plurality of database triggers, as previously described. For example, via the communications module 102, the control computer 40 may receive various information and commands from one or more client workstations 34 and DB server 36, from which the resultant source code is generated. Further, via the communications module 102, control computer 40 sends a variety of messages to DB server 36 comprising, for example, the generated source code for the plurality of database triggers previously described.

The command processing module 104 comprises program code that when executed by processing circuit 42 controls the control computer 40 to process the information and commands received by control computer 40 as input. As stated above, the information and commands include, but are not limited to, a Boolean expression identifying one or more verification checks to be applied to the data stored across a plurality of database tables, and metadata associated with a structure of the database associated with the plurality of database tables. The information and commands may also comprise a list of foreign keys FKs that directly link some of the database tables, table identifiers (e.g., table names) that identify one or more of the database tables, and other information as needed or desired. According to the present embodiments, the command processing module 104 extracts certain data from the information and commands, such as a plurality of tokens, that are associated with the automatic creation of the plurality of database triggers.

The verification module 106 comprises program code that when executed by processing circuit 42 controls the control computer 40 to implement verification functions on the data. Such verification functions include, but are not limited to, one or more functions for verifying that the plurality of tokens that are extracted from the information and commands are in the appropriate order and semantically valid, for verifying that the Boolean expression is received in an acceptable format and includes the requisite information, for verifying that the structure of the database identified by the metadata is correct and that the tables, foreign keys, columns, and the like exist, for verifying that the database tables do not form a circular path, for verifying that the foreign keys are not reflexive, and the like. In cases where the verification module 106 cannot verify the information, the verification module 106 may abort the process and cause the control computer 40 to output an error message explaining the reason for aborting the process.

The table path generation module 108 comprises program code that when executed by processing circuit 42 controls the control computer 40 to generate an indirect table path linking two database tables that are not directly linked together, such as DB tables 22 and 24, through one or more intermediary tables, such as DB tables 26 and 28. According to the present disclosure, the table path generation module 108 may automatically generate the indirect table path IDP using the list of foreign keys FKs processed by the command processing module 104 and verified by the verification module 106.

As stated above, the verification module 106 can also be configured to generate and verify the indirect table path IDP. In such embodiments, the verification module 106 and the table path generation module 108 may comprise a single module, or may comprise separate modules that communicate with each other to perform the verification and table path generation processes, as previously described. If verification is successful in these embodiments, the output would comprise a verified indirect table path IDP used to generate the source code for the database triggers.

The source code generation module 110 comprises program code that when executed by processing circuit 42 controls the control computer 40 to generate the source code that is subsequently used to create the plurality of database triggers. As previously stated, the source code generation module 110 comprises the instructions that control the control computer 40 to generate BEFORE UPDATE triggers and BEFORE INSERT triggers for each database table along the indirect table path IDP. The source code module 110 may generate the source code in any programming language needed or desired, but in at least one embodiment, generates the source code in the SQL language.

The optimization module 112 comprises program code that when executed by processing circuit 42 controls the control computer 40 to optimize the source code generated by the source code generation module 110. As previously stated, such optimizations may be directed to performance optimizations, and thus, address concern with respect to memory and CPU resources, for example. Once the source code has been optimized, the optimization module 112 may send the source code to the DB server 36 via IP network 32 for storage on DB storage device 38 and execution on DB server 36.

Figure 9:
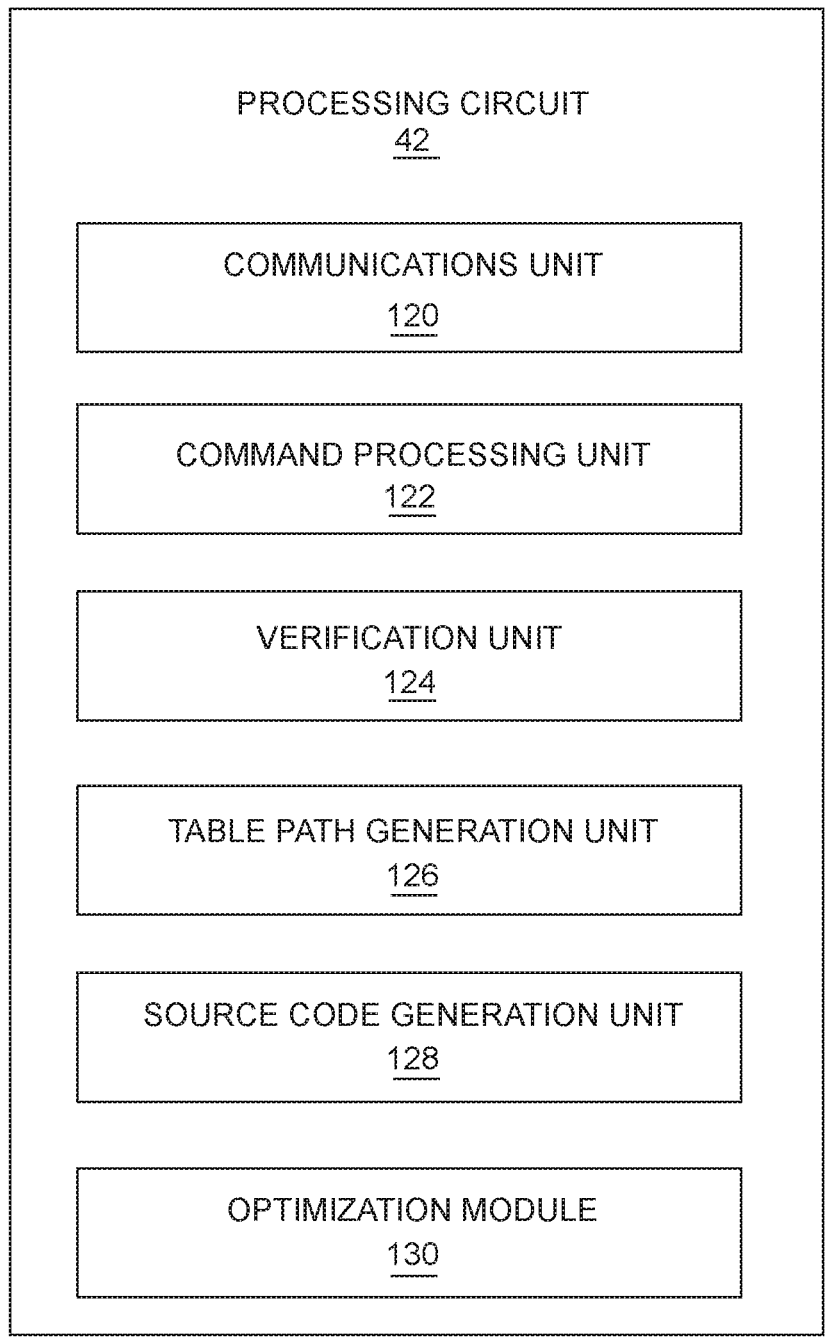
FIG. 9 is a functional block diagram illustrating physical hardware units within the processing circuitry of a control computer device configured according to embodiments of the present disclosure.

FIG. 9 is a block diagram illustrating some exemplary hardware units in a processing circuit 42 configured to perform the embodiments of the present disclosure. As seen in FIG. 9, processing circuit 42 comprises at least one of a communications unit 120, a command processing unit 122, a verification unit 124, a table path generation unit 126, a source code generation unit 128, and an optimization unit 130.

The communications unit 120 controls the control computer 40 to communicate with the DB server 36. Such communications are performed via IP network 32 using the well-known TCP/IP protocol, for example, and include the communication of messages to effect the automatic generation of source code for a plurality of database triggers, as previously described. For example, via the communications unit 120, the control computer 40 may receive various information and commands from one or more client workstations 34 and DB server 36, from which the resultant source code is generated. Further, via the communications unit 120, control computer 40 sends a variety of messages to DB server 36 comprising, for example, the generated source code for the plurality of database triggers previously described.

The command processing unit 122 controls the control computer 40 to process the information and commands received by control computer 40 as input. As stated above, the information and commands include, but are not limited to, a Boolean expression identifying one or more verification checks to be applied to the data stored across a plurality of database tables, and metadata associated with a structure of the database associated with the plurality of database tables. The information and commands may also comprise a list of foreign keys FKs that directly link some of the database tables, table identifiers (e.g., table names) that identify one or more of the database tables, and other information as needed or desired. According to the present embodiments, the command processing unit 122 extracts certain data from the information and commands, such as a plurality of tokens, that are associated with the automatic creation of the plurality of database triggers.

The verification unit 124 controls the control computer 40 to implement verification functions on the data. Such verification functions include, but are not limited to, one or more functions for verifying that the plurality of tokens that are extracted from the information and commands are in the appropriate order and semantically correct, for verifying that the Boolean expression is received in an acceptable format and includes the requisite information, for verifying that the structure of the database identified by the metadata is correct and that the tables, foreign keys, columns, and the like exist, for verifying that the database tables do not form a circular path, for verifying that the foreign keys are not reflexive, and the like. In cases where the verification unit 124 cannot verify the information, the verification unit 124 may abort the process and cause the control computer 40 to output an error message explaining the reason for aborting the process.

The table path generation unit 126 controls the control computer 40 to generate an indirect table path linking two database tables that are not directly linked together, such as DB tables 22 and 24, through one or more intermediary tables, such as DB tables 26 and 28. According to the present disclosure, the table path generation unit 126 may automatically generate the indirect table path IDP using the list of foreign keys FKs processed by the command processing unit 122 and verified by the verification unit 124.

The verification unit 124 may, in some embodiments, also be configured to generate and verify the indirect table path IDP. In such embodiments, the verification module 124 and the table path generation module 126 may comprise a single unitary module, or may comprise separate modules that communicate with each other to perform the verification and table path generation processes. In such embodiments, provided that verification is successful, the output would comprise a verified indirect table path IDP that can be used to generate the source code for the database triggers.

The source code generation unit 128 controls the control computer 40 to generate the source code that is subsequently used to create the plurality of database triggers. As previously stated, the source code generation unit 128 comprises the instructions that control the control computer 40 to generate BEFORE UPDATE triggers and BEFORE INSERT triggers for each database table along the indirect table path IDP. The source code generation unit 128 may generate the source code in any programming language needed or desired, but in at least one embodiment, generates the source code in the SQL language.

The optimization unit 130 controls the control computer 40 to optimize the source code generated by the source code generation unit 128. As previously stated, such optimizations may be directed to performance optimizations, and thus, address concerns with respect to memory and CPU resources, for example. Once the source code has been optimized, the optimization unit 130 may send the source code to the DB server 36 via IP network 32 for storage on DB storage device 38 and execution on DB server 36.

The present disclosure may, of course, be carried out in other ways than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

What is claimed is:

1. A method, implemented at a computing device, of creating source code for database triggers, the method comprising:
   obtaining information associated with creating a plurality of database triggers, wherein the plurality of database triggers verify the integrity of data stored across a plurality of database tables in a database, the information comprising:
      a Boolean expression identifying one or more verification checks to be applied to the data stored in the plurality of database tables; and
      metadata associated with a structure of the database;
   generating an indirect table path linking first and second database tables through an intermediary database table based on the metadata, wherein the indirect table path comprises foreign keys that link the first and second database tables to the intermediary database table;
   verifying the indirect table path against a set of predetermined policies; and generating source code for creating the plurality of database triggers based on the Boolean expression, the metadata, and the indirect table path.

2. The method of claim 1 wherein the metadata identifies the foreign keys that link the first and second database tables through the intermediary database table.

3. The method of claim 2 wherein generating an indirect table path linking first and second database tables through an intermediary database table based on the metadata further comprises determining an ordered sequence for the foreign keys.

4. The method of claim 1 wherein the metadata identifies the first and second database tables, and wherein generating an indirect table path linking first and second database tables through an intermediary database table based on the metadata comprises:
   querying the database to determine, based on identities of the first and second database tables, the foreign keys that link the first and second database tables to the intermediary database table; and
   determining an ordered sequence for the foreign keys.

5. The method of claim 1 wherein the metadata further comprises information identifying a connection to the database.

6. The method of claim 1 further comprising verifying the Boolean expression against a set of predetermined policies.

7. The method of claim 1 further comprising verifying the metadata against a set of predetermined policies.

8. The method of claim 1 wherein generating source code for creating the plurality of database triggers based on the Boolean expression, the metadata, and the indirect table path comprises generating the source code to create a plurality of INSERT BEFORE triggers and a plurality of UPDATE BEFORE triggers.

9. The method of claim 1 further comprising optimizing the source code for creating the plurality of database triggers.

10. A computing device comprising:
   a communications interface circuit configured to communicate data via a computer network with one or more devices; and
   a processing circuit operatively connected to the communications interface circuit and configured to:
      extract a plurality of tokens, based on a lexical analysis, from an input command associated with creating a plurality of database triggers that verify the integrity of data stored across a plurality of database tables in a database;
      verify the order of the plurality of tokens based on a syntactic analysis of the plurality of tokens; and
      if the order of the plurality of tokens is verified:
         verify the ordered plurality of tokens against a set of predetermined policies based on a semantic analysis of the plurality of tokens; and
         if the ordered plurality of tokens is verified:
            generate an indirect table path linking first and second database tables through an intermediary database table based on the ordered plurality of tokens, wherein the indirect table path comprises ordered foreign keys that link the first and second database tables to the intermediary database table;
            verify the indirect table path against a set of predetermined policies; and
            generate source code for creating the plurality of database triggers based on the ordered plurality of tokens and on the indirect table path.

11. The computing device of claim 10 wherein the input command associated with creating the plurality of database triggers comprises:
   a Boolean expression identifying one or more verification checks to be applied to the data stored across the plurality of database tables; and
   metadata associated with a structure of the database.

12. The computing device of claim 11 wherein the processing circuit is configured to verify one or both of the Boolean expression and the metadata against one or more predetermined policies.

13. The computing device of claim 10 wherein the input command associated with creating the plurality of database triggers comprises the foreign keys that link the first and second database tables to the intermediary database table.

14. The computing device of claim 10 wherein the input command associated with creating the plurality of database triggers identifies the first and second database tables, and wherein to generate an indirect table path, the processing circuit is configured to:
   query the database to determine, based on identities of the first and second database tables, the foreign keys that link the first and second database tables to the intermediary database table; and
   determine an ordered sequence for the foreign keys.

15. The computing device of claim 10 wherein to generate the source code for creating the plurality of database triggers, the processing circuit is configured to generate a plurality of CREATE TRIGGER commands.

16. The computing device of claim 10 wherein the source code for creating the plurality of database triggers comprises a plurality of INSERT BEFORE triggers and a plurality of UPDATE BEFORE triggers.

17. The computing device of claim 10 wherein the processing circuit is further configured to optimize the source code for creating the plurality of database triggers.

18. A non-transitory computer-readable storage medium comprising computer code stored thereon, wherein, when executed by a processing circuit of a computer, causes the computer to:
   obtain information associated with creating a plurality of database triggers, wherein the plurality of database triggers verify the integrity of data stored across a plurality of database tables in a database, the information comprising:
      a Boolean expression identifying one or more verification checks to be applied to the data stored in the plurality of database tables; and
      metadata associated with a structure of the database;
   verify one or both of the Boolean expression and the metadata against a set of predetermined policies; and
   if the one or both of the Boolean expression and the metadata are verified:
      generate an indirect table path linking first and second database tables through an intermediary database table based on the metadata, wherein the indirect table path comprises ordered foreign keys that link the first and second database tables to the intermediary database table;
      verify the indirect table path against a set of predetermined policies; and
      generate source code for creating the plurality of database triggers based on the Boolean expression, the metadata, and the indirect table path.

* * * * *